(12) United States Patent
Agranov et al.

(10) Patent No.: US 9,344,647 B2
(45) Date of Patent: May 17, 2016

(54) IMAGING SYSTEMS WITH DYNAMIC SHUTTER OPERATION

(71) Applicant: Semiconductor Components Industries, LLC, Phoenix, AZ (US)

(72) Inventors: Gennadiy Agranov, San Jose, CA (US); Sergey Velichko, Boise, ID (US); John W. Ladd, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 332 days.

(21) Appl. No.: 14/012,403

(22) Filed: Aug. 28, 2013

(65) Prior Publication Data

US 2015/0009375 A1 Jan. 8, 2015

Related U.S. Application Data

(60) Provisional application No. 61/843,821, filed on Jul. 8, 2013.

(51) Int. Cl.
*H04N 5/335* (2011.01)
*H04N 5/355* (2011.01)

(52) U.S. Cl.
CPC ....... *H04N 5/35536* (2013.01); *H04N 5/35554* (2013.01); *H04N 5/35572* (2013.01); *H04N 5/35581* (2013.01)

(58) Field of Classification Search
CPC .......... H04N 5/35536; H04N 5/35572; H04N 5/35554; H04N 5/35581
USPC ................. 348/296, 297, 299, 362; 250/208.1
See application file for complete search history.

(56) References Cited

U.S. PATENT DOCUMENTS

| 8,026,966 | B2* | 9/2011 | Altice | H04N 5/35527 348/294 |
| 2008/0055440 | A1* | 3/2008 | Pertsel | H04N 5/3535 348/297 |
| 2011/0080500 | A1* | 4/2011 | Wang | H04N 5/35554 348/231.3 |
| 2011/0279722 | A1* | 11/2011 | Cieslinski | H04N 5/35572 348/308 |
| 2012/0069213 | A1* | 3/2012 | Jannard | H04N 5/35554 348/229.1 |

FOREIGN PATENT DOCUMENTS

| WO | 9909737 | 2/1999 |
| WO | 0052926 | 9/2000 |

* cited by examiner

*Primary Examiner* — Nhan T Tran
(74) *Attorney, Agent, or Firm* — Treyz Law Group, P.C; Kendall P. Woodruff

(57) ABSTRACT

An imaging system may include an image sensor having an array of image pixels. Each image pixel may include an electronic shutter for controlling when a photosensor in the image pixel accumulates charge. The electronic shutter may be operable in an open state during which charge is allowed to accumulate on the photosensor and a closed state during which charge is drained from the photosensor. The electronic shutter may be cycled through multiple open and closed states during an image frame capture. At the end of each open state, the charge that has been acquired on the photosensor may be transferred from the photosensor to a pixel memory element. By breaking up the total exposure time for a pixel during an image frame into shorter, non-continuous periods of exposure time, dynamic scenery image artifacts may be minimized while maintaining the desired total exposure time.

18 Claims, 5 Drawing Sheets

IMAGING SYSTEMS WITH DYNAMIC SHUTTER OPERATION

This application claims the benefit of provisional patent application No. 61/843,821, filed Jul. 8, 2013, which is hereby incorporated by reference herein in its entirety.

BACKGROUND

This relates generally to imaging systems, and more particularly, to imaging systems with dynamic shutter functionality.

Modern electronic devices such a cellular telephones, cameras, and computers often use digital image sensors. Imagers (i.e., image sensors) often include a two-dimensional array of image sensing pixels. Each pixel typically includes a photosensor such as a photodiode that receives incident photons (light) and converts the photons into electrical signals.

In conventional imaging systems, image artifacts may be caused by moving objects, moving or shaking camera, flickering lighting, and objects with changing illumination in an image frame. Such artifacts may include, for example, missing parts of an object, edge color artifacts, and object distortion. Examples of objects with changing illumination include light-emitting diode (LED) traffic signs (which can flicker several hundred times per second) and LED stop lights of modern cars.

While electronic rolling shutter and global shutter modes produce images with different artifacts, the root cause for such artifacts is common for both modes of operation. Typically, image sensors acquire light asynchronously relative to the scenery being captured. This means that portions of an image frame may not be exposed for part of the frame duration. This is especially true for bright scenery when integration times are much shorter than the frame time used. Zones in an image frame that are not fully exposed to dynamic scenery may result in object distortion, ghosting effects, and color artifacts when the scenery includes moving or fast-changing objects. Similar effects may be observed when the camera is moving or shaking during image capture operations.

It would therefore be desirable to be able to provide improved imaging systems for capturing images with minimized artifacts related to moving objects, moving or shaking camera, flickering lighting, and objects with changing illumination.

DETAILED DESCRIPTION

Electronic devices such as digital cameras, computers, cellular telephones, and other electronic devices include image sensors that gather incoming image light to capture an image. The image sensors may include arrays of imaging pixels. The pixels in the image sensors may include photosensitive elements such as photodiodes that convert the incoming image light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the imaging pixels and readout circuitry for reading out image signals corresponding to the electric charge generated by the photosensitive elements.

Each image pixel in a pixel array may include a shutter element for controlling when the photosensitive element acquires charge. For example, when a pixel's shutter element is "open," photocurrent may accumulate on the photosensitive element. When a pixel's shutter element is "closed," the photocurrent may be drained out from the pixel and discarded.

The shutter elements may be operated dynamically by being opened and closed multiple times throughout the duration of an imaging frame. Each cycle of dynamic shutter operation may include a period of time when the shutter is open and a period of time when the shutter is closed. At the end of each cycle, the charge that has been acquired on the photosensitive element during the cycle may be transferred from the photosensitive element to a pixel memory element. By repeating this sequence multiple times, the charge accumulated on the pixel memory element may represent the entire scenery being captured without significantly unexposed "blind" time spots.

Figure 1:
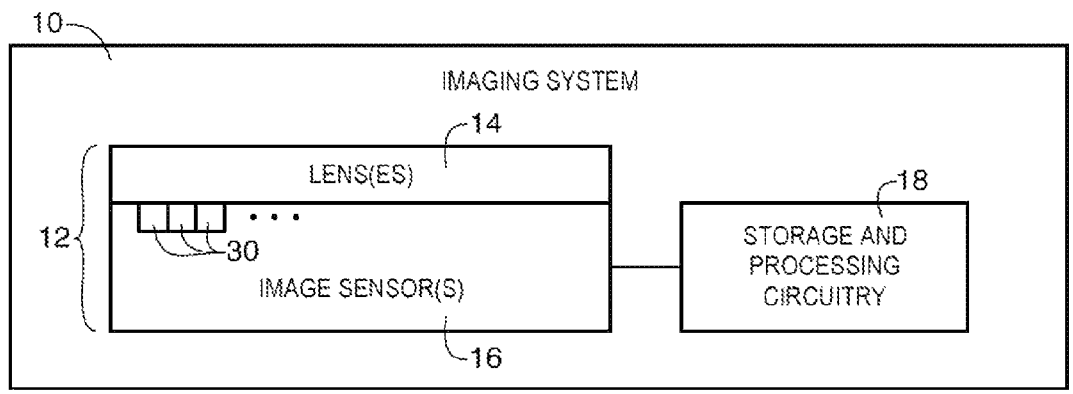
FIG. 1 is a diagram of an illustrative imaging system that may include an image sensor having image pixels with dynamically operated electronic shutters in accordance with an embodiment of the present invention.

FIG. 1 is a diagram of an illustrative imaging system that uses image pixels with dynamically operated shutter elements. Imaging system 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. Image sensor 16 may be an image sensor integrated circuit die with an array of image pixels 30. Image pixels 30 may each include a shutter element for controlling when charge is acquired on the image pixel.

During image capture operations, lens 14 may focus light from a scene onto an image pixel array in image sensor 16.

Image sensor 16 may provide corresponding digital image data to control circuitry such as storage and processing circuitry 18.

Circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be further processed and/or stored using processing circuitry 18. Processed image data may, if desired, be provided to external equipment (e.g., a computer or other device) using wired and/or wireless communications paths coupled to processing circuitry 18. Processing circuitry 18 may be used in controlling the operation of image sensors 16.

Figure 2:
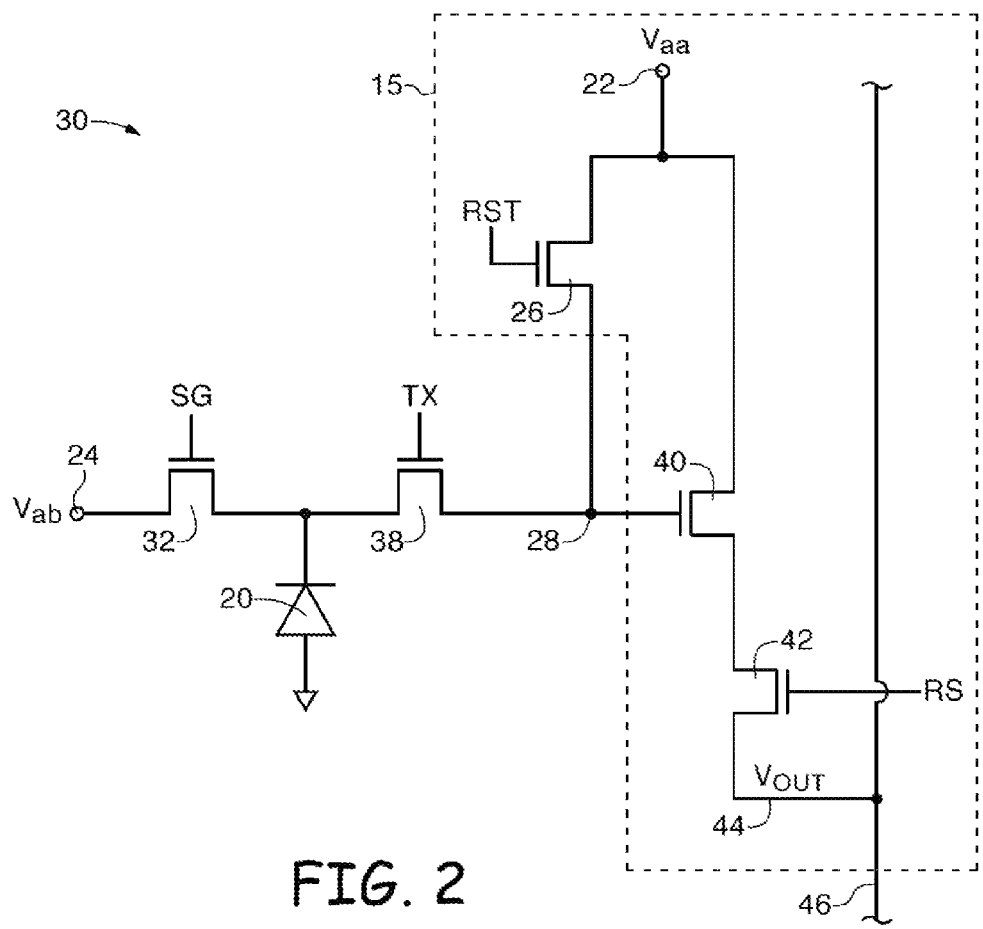
FIG. 2 is a diagram of an image pixel that can be used to support a dynamic shutter mode of operation in accordance with an embodiment of the present invention.

FIG. 2 is a circuit diagram of an illustrative image pixel 30. As shown in FIG. 2, pixel 30 includes a photosensitive element such as photodiode 20. A positive power supply voltage Vaa may be supplied at positive power supply terminal 22. A second power supply voltage Vab may be supplied at second power supply terminal 24. Incoming light may be collected by photodiode 20 after passing through a color filter structure. Photodiode 20 generates charge (e.g., electrons) in response to receiving impinging photons. The amount of charge that is collected by photodiode 20 depends on the intensity of the impinging light and the exposure duration (or integration time).

Before an image is acquired, reset control signal RST may be asserted. Asserting signal RST turns on reset transistor 26 and resets charge storage node 28 (sometimes referred to as floating diffusion region FD) to Vaa. Reset control signal RST may then be deasserted to turn off reset transistor 26.

Pixel 30 may include a shutter gate such as shutter gate 32. Shutter gate 32 may have a gate terminal that is controlled by shutter control signal SG. Asserting shutter control signal SG turns on shutter gate 32 and resets photodiode 20 to power supply voltage Vab (e.g., by connecting Vab to photodiode 20 through shutter gate 32). When signal SG is deasserted, photodiode 20 may be allowed to accumulate photo-generated charge.

Because charge is allowed to accumulate on photodiode 20 when signal SG is deasserted (i.e., when SG is low), the OFF state of transistor 32 may correspond to an open electronic shutter for pixel 30. Similarly, because photodiode 20 is reset to power supply voltage Vab when signal SG is asserted (i.e., when SG is high), the ON state of transistor 32 may correspond to a closed electronic shutter for pixel 30. In general, an "open" electronic shutter may be used herein to refer to the state in which photodiode 20 is allowed to accumulate charge (i.e., the state in which transistor 32 is deasserted), whereas a "closed" electronic shutter may be used herein to refer to the state in which photodiode 20 is reset to power supply voltage Vab (i.e., the state in which transistor 32 is asserted).

Pixel 30 may include a transfer gate (transistor) 38. Transfer gate 38 may have a gate terminal that is controlled by transfer control signal TX. Transfer signal TX may be pulsed to transfer charge from photodiode 20 to charge storage region 28. Floating diffusion region 28 may be a doped semiconductor region (e.g., a region in a silicon substrate that is doped by ion implantation, impurity diffusion, or other doping process).

If desired, pixel 30 may have additional storage regions for temporarily storing charge transferred from photodiode 20. For example, an intermediate memory node such as a diffused diode and intermediate transfer gate or any other suitable in-pixel memory configuration may be located between transfer transistor 38 and source follower transistor 40. The configuration of FIG. 2 is merely illustrative.

Pixel 30 may include readout circuitry such as charge readout circuitry 15. Charge readout circuit 15 may include row-select transistor 42 and source-follower transistor 40. Transistor 42 may have a gate that is controlled by row select signal RS. When signal RS is asserted, transistor 42 is turned on and a corresponding signal Vout (e.g. an output signal having a magnitude that is proportional to the amount of charge at floating diffusion node 28), is passed onto output path 44.

Shutter gate 32 may be pulsed dynamically during a frame capture. Each cycle of dynamic shutter operation may include a period of time when shutter 32 is open (i.e., when SG is low) and a period of time when shutter 32 is closed (i.e., when SG is high). When shutter 32 is closed, charge is drained from pixel 30 and discarded. When shutter 32 is open, charge is acquired on photodiode 20. At the end of each cycle, transfer gate TX may be pulsed to transfer charge that has accumulated on photodiode 20 during the cycle to charge storage region 28.

In a typical image pixel array configuration, there are numerous rows and columns of pixels 30. A column readout path such as output line 46 may be associated with each column of pixels 30 (e.g. each image pixel 30 in a column may be coupled to output line 46 through an associated row-select transistor 42). Signal RS may be asserted to read out signal Vout from a selected image pixel onto column readout path 46. Image data Vout may be fed to processing circuitry 18 for further processing. The circuitry of FIG. 2 is merely illustrative. If desired, pixel 30 may include other pixel circuitry.

The configuration of FIG. 2 in which pixel 30 includes an electronic shutter formed from shutter gate 32 is merely illustrative. If desired, pixels 30 may be provided with other suitable types of shutter elements, such as mechanical shutter elements or electro-optical shutter elements. For example, each pixel 30 may be provided with a liquid crystal electro-optical shutter (LCEOS). Control signals may be applied to each LCEOS to determine when the LCEOS is transparent (i.e., when the shutter is open) and when the LCEOS is non-transparent (i.e., when the shutter is closed). As another example, pixels 30 may include shutter elements formed from mechanical shutter structures such as microelectromechanical systems (MEMS) based shutter structures. Configurations in which pixels 30 are provided with electronic shutter elements are merely illustrative and are sometimes described here in as an example.

Figure 3:
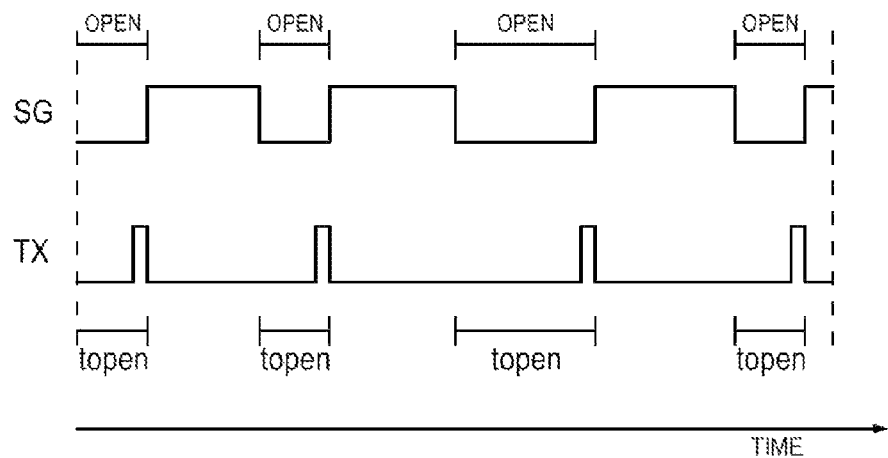
FIG. 3 is a timing diagram showing relevant signal behavior of an illustrative image pixel during an image capture and showing how dynamic shutter operations may be implemented in accordance with an embodiment of the present invention.

FIG. 3 is a timing diagram illustrating how dynamic shutter operation may be implemented in pixel 30. As shown in FIG. 3, shutter control signal SG may be pulsed multiple times during an image frame. When signal SG is low, shutter 32 is OPEN and charge is allowed to accumulate on photodiode 20. When SG is high, shutter 32 is closed. A "shutter cycle" may be used herein to refer to a period that includes one closed period in which SG is high and one OPEN period in which SG is low.

At the end of each OPEN period, signal TX is pulsed to transfer the charge that was accumulated during the OPEN period to floating diffusion node 28. Each OPEN period may have any desired duration. Charge acquisition time $t_{open}$ for each cycle is defined as the time between the falling edge of the SG pulse and the falling edge of the subsequent TX pulse. The charge acquisition times in a given image frame need not have the same duration $t_{open}$. The total charge acquisition time T of pixel 30 during an image frame capture (sometimes referred to as the total pixel exposure time T) may be defined as the sum of all $t_{open}$ the frame acquisition time.

Charge may be transferred from photodiode 20 to floating diffusion node 28 using a short TX pulse at the end of each shutter cycle. During readout time, accumulated charge on floating diffusion node 28 may be converted to a corresponding pixel signal Vout using, for example, a known correlated double sampling technique.

Because $t_{open}$ is much shorter than the length of an image frame, multiple shutter cycles may fit into a portion of a frame length or into the entire frame length without compromising pixel exposure timing (i.e., while maintaining the desired total pixel exposure time T).

By breaking up the total exposure time T during an image frame into shorter, non-continuous integration periods, image artifacts caused by moving objects, flickering lighting, and objects with changing illumination may be minimized without compromising pixel exposure time (i.e., while maintaining the desired total exposure time T).

Figure 4:
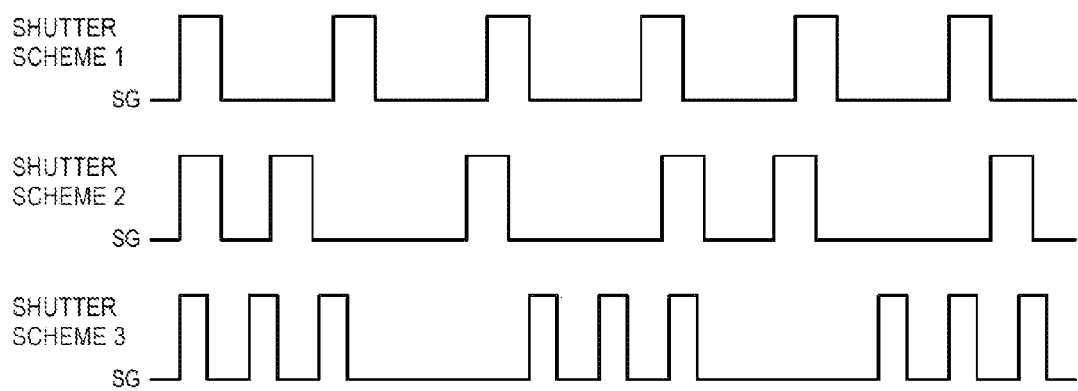
FIG. 4 is a timing diagram showing illustrative shutter signal patterns for a dynamic shutter such as an even shutter signal pattern, a random shutter signal pattern, and a synchronized burst shutter signal pattern in accordance with an embodiment of the present invention.

The timing of shutter pulses may have any suitable pattern. FIG. 4 is a timing diagram illustrating different examples of shutter signal schemes for operating shutter 32 of pixel 30. In shutter scheme 1, signal SG is pulsed at even (uniform) intervals. In shutter scheme 2, signal SG is pulsed at random intervals. In shutter scheme 3, signal SG is pulsed in even bursts, where each burst includes multiple pulses at even intervals. If desired, other shutter schemes may be used. For example, signal SG may be pulsed in random bursts, where each burst includes multiple pulses and where the bursts occur at random intervals. The schemes shown in FIG. 4 are merely illustrative.

Image pixels such as image pixel 30 with dynamically operated electronic shutters may be implemented in electronic rolling shutter (ERS) mode image sensors (e.g., in liner ERS mode image sensors or in high dynamic range (HDR) ERS mode image sensors), or may be implemented in global shutter (GS) mode image sensors, if desired.

In ERS mode image sensors, pixel rows in between a shutter row and a readout row may be controlled using any suitable shutter scheme. In GS mode image sensors, the entire array of pixels may be controlled using any suitable scheme.

If desired, one pixel in image sensor 16 may be controlled using one shutter scheme (e.g., shutter scheme 1 of FIG. 4), whereas another pixel in image sensor 16 may be controlled using another shutter scheme (e.g., shutter scheme 2 of FIG. 4). As another example, groups of pixels may be operated using a common shutter scheme that is different from other groups of pixels in image sensor 16 (e.g., groups of pixels may be operated using a common electronic shutter). In general, any suitable combination of dynamic shutter schemes may be used to control individual pixels 30 in the pixel array of image sensor 16.

If desired, some pixels may not be operated with a dynamic shutter. For example, one or more pixels may be configured to be continuously exposed during the entire integration time T. Pixels that accumulate charge using this type of continuous integration may be used in combination with pixels that accumulate charge in cycles (if desired). For example, one out of every four rows of pixels may accumulate charge over a continuous integration period, while the other three out of every four rows of pixels may accumulate charge in pulse trains.

Figure 5:
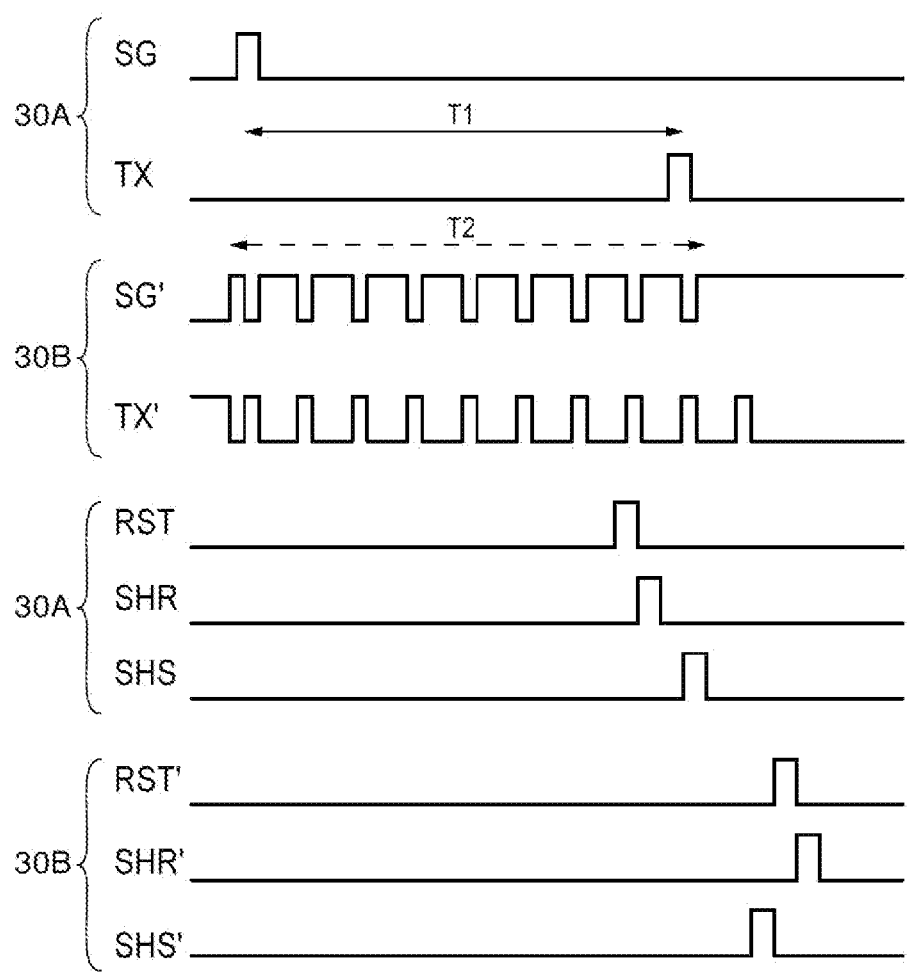
FIG. 5 is a timing diagram showing relevant signal behavior of an illustrative image pixel during an image frame capture and showing how dynamic shutter operations may be implemented in a rolling shutter high dynamic range mode image sensor in accordance with an embodiment of the present invention.
Figure 6:
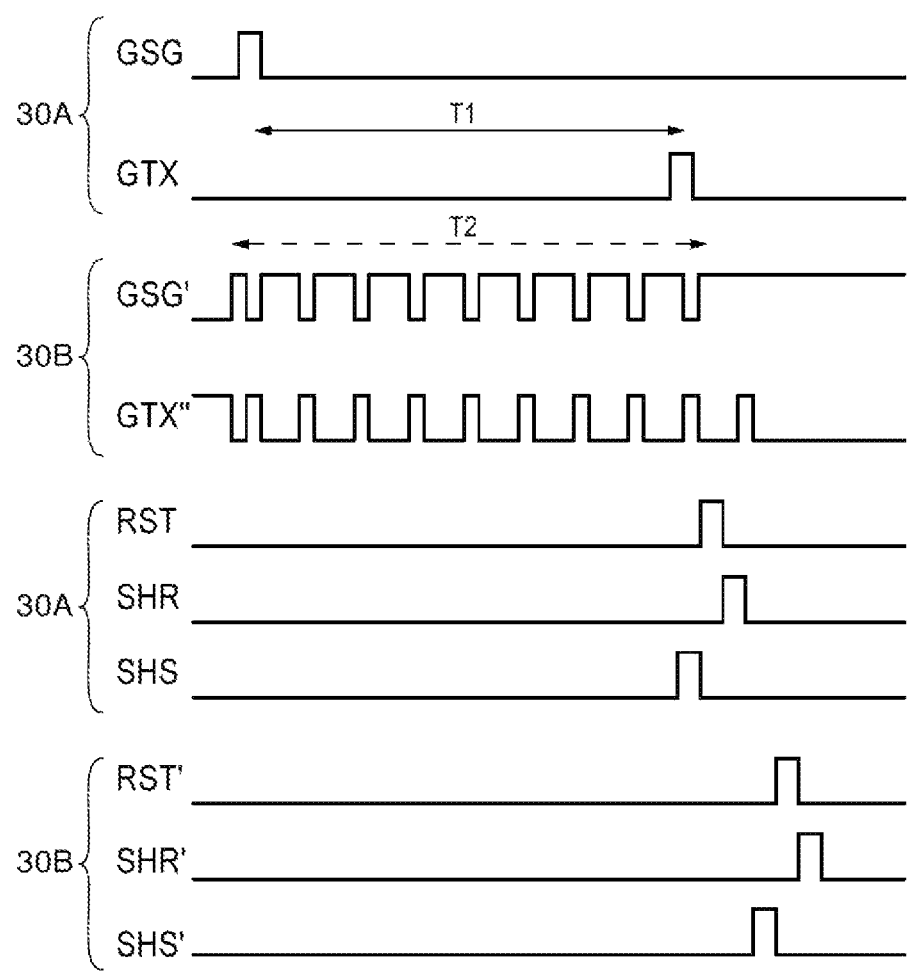
FIG. 6 is a timing diagram showing relevant signal behavior of an illustrative image pixel during an image frame capture and showing how dynamic shutter operations may be implemented in a global shutter high dynamic range mode image sensor in accordance with an embodiment of the present invention.

FIGS. 5 and 6 are timing diagrams showing relevant signal behavior of illustrative image pixels 30A and 30B (e.g., image pixels of the type shown in FIG. 2) during charge acquisition and readout. FIG. 5 corresponds to image pixels that form part of an ERS mode image sensor, whereas FIG. 6 corresponds to image pixels that form part of a GS mode image sensor.

For simplicity, FIGS. 5 and 6 correspond to high dynamic range ERS and high dynamic range GS configurations, respectively. With this type of configuration, some pixels such as pixels 30A are exposed for a total time of T1 during an image frame, while other pixels such as pixels 30B are exposed for a shorter time of T2 during an image frame. The exposure time for pixels 30B may therefore be a short integration time relative to T1 (i.e., T2 may be less than T1). The lines indicating the span of T2 in FIGS. 5 and 6 are dashed to indicate that the time T2 is non-continuous and is composed of multiple shorter segments of time, such that the total exposure time T2 is less than time T1.

The short integration time may be used to better capture details of brightly lit portions of a scene, while the longer integration time may be used to better capture details of dark portions of the scene. Images captured with the different integration times may be combined into a composite image that resolves both the bright and dark portions of the image. Because pixels 30B capture image data (non-continuously) throughout the same time frame as pixels 30A, the composite image may have less motion and color artifacts associated with a dynamic scenery.

This is, however, merely illustrative. One skilled in the art may project the pixel operation described in connection with FIGS. 5 and 6 onto linear ERS or linear GS modes of operation by using only T2 timing (as an example).

As shown in ERS mode example of FIG. 5, pixel 30A may be exposed continuously for the entire integration period T1. In other words, shutter signal SG may remain low for the entire integration period T1. At the end of integration period T1, transfer signal TX may be pulsed to transfer the accumulated charge from the photodiode to the floating diffusion node.

To implement correlated double sampling in pixel 30A, reset signal RST may be pulsed before transfer signal TX is asserted to reset the floating diffusion node to power supply voltage Vaa. The reset signal may be sampled by asserting sample-and-hold reset signal SHR. The sampled reset voltage may be conveyed through output path 44 to column readout line 46 to processing circuitry 18 (FIGS. 1 and 2). After the reset signal has been sampled, transfer signal TX is asserted to transfer charge accumulated during continuous time T1 to the floating diffusion node. The corresponding pixel signal may then be sampled by asserting sample-and-hold signal SHS. The sampled pixel signal may be conveyed through output path 44 to column readout line 46 to processing circuitry 18 for further processing.

The correlated double sampling technique described in connection with pixel 30A is merely illustrative. If desired, other sampling schemes may be used. For example, the SHS signal may be asserted first, followed by the RST signal and the SHR signal.

As shown in FIG. 5, pixel 30B may be exposed in cycles by pulsing SG'. Each cycle may have an associated integration time $t_{open}$. The sum of all $t_{open}$ periods is equal to the total integration time T2 for pixels 30B. At the end of each cycle, transfer signal TX' is pulsed to transfer the charge accumulated during time $t_{open}$ from the photodiode to the floating diffusion node. After the accumulated charge from the last shutter cycle is transferred to the floating diffusion node, the charge stored in the floating diffusion corresponds to the total amount of charge accumulated during the non-continuous integration time T2 (i.e., the total amount of charge accumulated during pulses of integration).

To implement pseudo correlated double sampling in pixel 30B, the pixel signal corresponding to the total amount of charge stored on the floating diffusion node after the last shutter cycle (and after the last corresponding TX' pulse) may be sampled by asserting sample-and-hold signal SHS'. The sampled pixel signal may be conveyed through output path 44 to column readout line 46 to processing circuitry 18. After the pixel signal has been sampled, reset signal RST' may be asserted to reset the floating diffusion node to power supply voltage Vaa. The reset signal may then be sampled by asserting sample-and-hold reset signal SHR'. The sampled reset voltage may be conveyed through output path 44 to column readout line 46 to processing circuitry 18 for further processing.

This is, however, merely illustrative. One skilled in the art may project the pixel operation described in connection with pixel 30B of FIG. 5 to a pixel that includes a pixel memory node between the transfer transistor and floating diffusion node (e.g., a diffused memory diode and intermediate transfer gate between the memory diode and the floating diffusion node). The pixel operation may include signals to implement true correlated double sampling of the floating diffusion node similar to the readout operation of pixel 30A.

As shown in the GS mode example of FIG. 6, pixel 30A may be exposed continuously for the entire integration period T1. In other words, global shutter signal GSG may remain low for the entire integration period T1. At the end of integration period T1, global transfer signal GTX may be pulsed to transfer the charge accumulated during continuous integration time T1 from the photodiode to the floating diffusion node.

To implement correlated double sampling in pixel 30A, the pixel signal corresponding to the total amount of charge stored on the floating diffusion node may be sampled by asserting sample-and-hold signal SHS. The sampled pixel signal may be conveyed through output path 44 to column readout line 46 to processing circuitry 18. After the pixel signal has been sampled, reset signal RST may be asserted to reset the floating diffusion node to power supply voltage Vaa. The reset signal may then be sampled by asserting sample-and-hold reset signal SHR. The sampled reset voltage may be conveyed through output path 44 to column readout line 46 to processing circuitry 18 for further processing.

The correlated double sampling technique described in connection with pixel 30A is merely illustrative. If desired, other sampling schemes may be used. For example, the RST signal may be asserted first, followed by the SHR signal and the SHS signal.

As shown in FIG. 6, pixel 30B may be exposed in cycles by pulsing global shutter gate signal GSG'. Each cycle may have an associated integration time $t_{open}$. The sum of all $t_{open}$ periods is equal to the total integration time T2 for pixels 30B. At the end of each cycle, global transfer signal GTX' is pulsed to transfer the charge accumulated during time $t_{open}$ from the photodiode to the floating diffusion node. After the accumulated charge from the last shutter cycle is transferred to the floating diffusion node, the charge stored in the floating diffusion corresponds to the total amount of charge accumulated during non-continuous exposure time T2 (i.e., the total amount of charge accumulated during pulses of integration).

To implement correlated double sampling in pixel 30B, the pixel signal corresponding to the total amount of charge stored on the floating diffusion node after the last shutter cycle (and after the corresponding last GTX' pulse) may be sampled by asserting sample-and-hold signal SHS'. The sampled pixel signal may be conveyed through output path 44 to column readout line 46 to processing circuitry 18. After the pixel signal has been sampled, reset signal RST' may be asserted to reset the floating diffusion node to power supply voltage Vaa. The reset signal may then be sampled by asserting sample-and-hold reset signal SHR'. The sampled reset voltage may be conveyed through output path 44 to column readout line 46 to processing circuitry 18 for further processing.

The examples of FIGS. 5 and 6 in which T1 is a continuous integration time are merely illustrative. If desired, pixels 30A may be exposed in pulses of shorter integration times, each having an associated integration time $t_{open}$. The sum of all $t_{open}$ periods may be equal to integration time T1.

Figure 7:
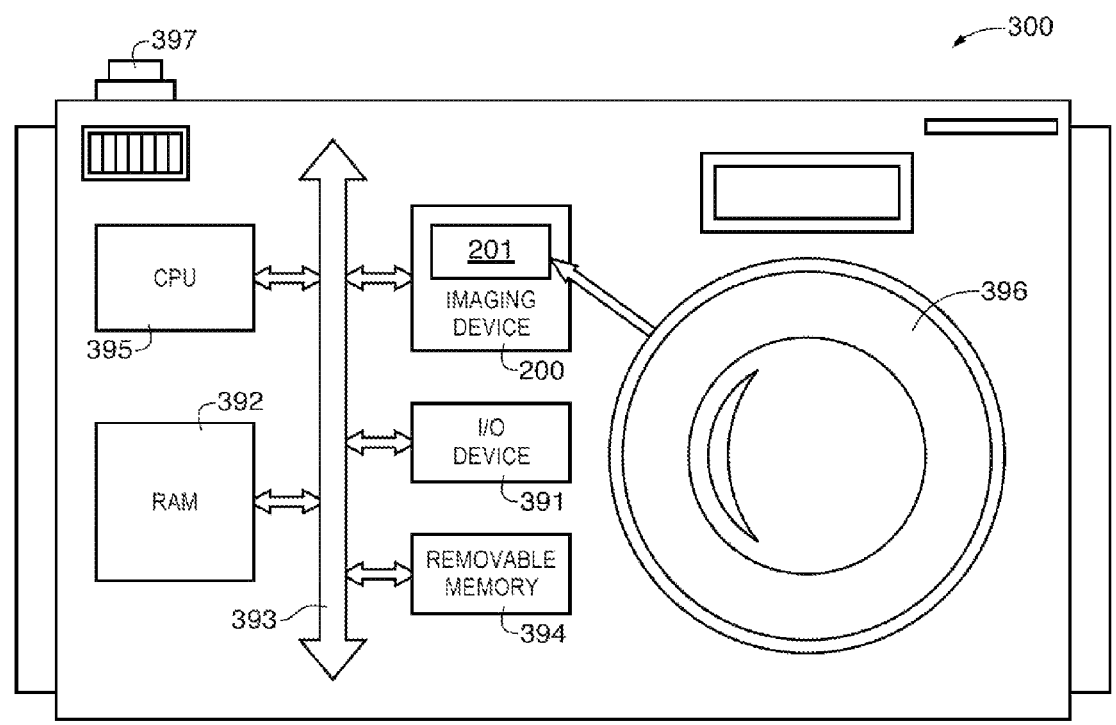
FIG. 7 is a block diagram of a system employing the embodiments of FIGS. 1-6 in accordance with an embodiment of the present invention.

FIG. 7 shows in simplified form a typical processor system 300, such as a digital camera, which includes an imaging device 200. Imaging device 200 may include a pixel array 201 (e.g., an array of image sensor pixels such as image sensor pixels 30 of FIG. 2 having dynamically operated electronic shutters). Processor system 300 is exemplary of a system having digital circuits that may include imaging device 200. Without being limiting, such a system may include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating imaging systems having image sensors with arrays of pixels having dynamically operated electronic shutters.

Each image pixel in the pixel array may include an electronic shutter for controlling when a photosensitive element in the pixel acquires charge. For example, when a pixel's electronic shutter is "open," charge may be allowed to accumulate on the photosensitive element. When a pixel's electronic shutter is "closed," the charge may be drained out from the pixel and discarded.

The electronic shutters may be operated dynamically by being cycled through open closed states multiple times throughout the duration of an imaging frame. Each shutter cycle of dynamic shutter operation may include a period of time when the shutter is open and a period of time when the shutter is closed. At the end of each cycle, the charge that has accumulated on the photosensitive element during the cycle may be transferred from the photosensitive element to a pixel memory element. By repeating this sequence multiple times throughout the image frame, the charge accumulated on the pixel memory element may represent the entire scenery being captured without significantly unexposed "blind" time spots.

By breaking up the total exposure time for a pixel during an image frame into shorter, non-continuous periods of exposure time, image artifacts caused by moving objects, flickering lighting, and objects with changing illumination may be minimized without compromising pixel exposure time (i.e., while maintaining the desired total exposure time).

Pixels may be exposed at even intervals during an image frame, at random intervals during an image frame, or in synchronized bursts during an image frame, where each burst includes multiple shutter pulses. If desired, some pixels may be exposed over a single continuous period of time while other pixels may be exposed in non-continuous periods of time.

The foregoing is merely illustrative of the principles of this invention which can be practiced in other embodiments.

What is claimed is:

1. A method for capturing image data with first and second image pixels during an image frame, wherein the first image pixel comprises a photosensor, a power supply terminal, a first transistor coupled between the power supply terminal and the photosensor, a charge storage region, a charge readout circuit coupled between the charge storage region and an output line, and a second transistor coupled between the photosensor and the charge storage region, the method comprising:
   with the photosensor in the first image pixel, accumulating a first amount of charge over a first exposure time, wherein the first exposure time is non-continuous and comprises multiple integration periods that are each shorter than the first exposure time, wherein the integration periods are separated by non-integration periods;
   prior to each integration period, resetting the photosensor using the first transistor;
   at the end of each integration period, transferring a portion of the first amount of charge from the photosensor to the charge storage region using the second transistor;
   asserting the first transistor during each non-integration period, wherein charge is drained from the photosensor when the first transistor is asserted; and
   with the second image pixel, accumulating a second amount of charge over a second exposure time, wherein the second exposure time is continuous and overlaps the integration periods and non-integration periods of the first image pixel.

2. The method defined in claim 1 further comprising:
   with the charge readout circuit, supplying a signal to the output line corresponding to the first amount of charge on the charge storage region.

3. The method defined in claim 2 wherein transferring the portion of the first amount of charge from the photosensor to the charge storage region at the end of each integration period comprises transferring all collected charge that accumulated on the photosensor during the integration period to the charge storage region.

4. The method defined in claim 2 wherein the integration periods occur at uniform intervals.

5. The method defined in claim 2 wherein the integration periods occur at random intervals.

6. The method defined in claim 2 wherein the integration periods occur in synchronized bursts.

7. The method defined in claim 1 further comprising:
   deasserting the first transistor during the integration periods, wherein when the first transistor is deasserted, charge accumulates on the photosensor.

8. A method for capturing high dynamic range image data with an array of image pixels during an image frame, wherein each image pixel in the array comprises a photosensor and a shutter element, wherein the shutter element is operable in an open state during which the photosensor accumulates charge and a closed state during which charge is drained from the photosensor, the method comprising:
   with a first plurality of image pixels in the array, accumulating charge during a first exposure period;
   with a second plurality of image pixels in the array, accumulating charge during a second exposure period, wherein the second exposure period is shorter than the first exposure period, wherein the second exposure period is non-continuous and comprises a plurality of integration periods, wherein the first exposure period is continuous and overlaps at least two of the integration periods of the second exposure period; and
   with control circuitry, placing the shutter elements associated with the second plurality of image pixels in the open state during each integration period and in the closed state.

9. The method defined in claim 8 further comprising:
   with the control circuitry, placing the shutter elements associated with the first plurality of image pixels in the open state during the first exposure period.

10. The method defined in claim 8 wherein the integration periods occur at uniform intervals.

11. The method defined in claim 8 wherein the integration periods occur at random intervals.

12. The method defined in claim 8 wherein the integration periods occur in synchronized bursts.

13. The method defined in claim 8 wherein each shutter element comprises an electronic shutter element, wherein each electronic shutter element is electrically coupled between a power supply terminal and an associated one of the photosensors, and wherein placing the shutter elements associated with the second plurality of image pixels in the closed state comprises resetting the photosensors associated with the second plurality of image pixels to a power supply voltage.

14. The method defined in claim 8 further comprising:
   in between the integration periods, draining charge from the photosensors associated with the second plurality of image pixels.

15. The method defined in claim 8 further comprising:
   for each image pixel in the second plurality of image pixels, transferring the charge accumulated during each integration period from the photosensor to a charge storage region; and
   with a readout circuit, outputting a signal corresponding to the charge on the charge storage region.

16. A system, comprising:
   a central processing unit;
   memory;
   input-output circuitry; and
   an imaging device, wherein the imaging device comprises:
      a pixel array having a plurality of image pixels including short-exposure pixels and long-exposure pixels, wherein at least one short-exposure pixel in the pixel array comprises an electronic shutter for controlling when the short-exposure pixel accumulates charge, wherein the electronic shutter is operable in an open state during which the short-exposure pixel accumulates charge and a closed state during which charge is drained from the short-exposure pixel, wherein the short-exposure pixel is configured to cycle through multiple integration periods during which the electronic shutter is in the open state and multiple non-integration periods during which the electronic shutter is in the closed state, and wherein the long-exposure pixel accumulates charge over a continuous exposure period that overlaps at least two of the integration periods of the short-exposure pixel; and processing circuitry that combines image data from the short-exposure pixels with image data from the long-exposure pixels to form a high-dynamic range image.

17. The system defined in claim 16 wherein the short-exposure pixel comprises a photosensor, a storage region, and a transfer transistor, and wherein the transfer transistor is configured to transfer an amount of charge accumulated on the photosensor during each integration period from the photosensor to the storage region.

18. The system defined in claim 17 wherein the electronic shutter comprises a shutter gate coupled between the photosensor and a power supply terminal and wherein the shutter gate is configured to drain charge from the photosensor during each non-integration period.

* * * * *